United States Patent
Sethi et al.

(10) Patent No.: US 12,141,293 B2
(45) Date of Patent: Nov. 12, 2024

(54) METHOD AND SYSTEM FOR PROACTIVELY DETECTING AND FILTERING VULNERABILITIES OF AN APPLICATION UPGRADE BEFORE PERFORMING THE APPLICATION UPGRADE

(71) Applicant: Dell Products L.P., Round Rock, TX (US)

(72) Inventors: Parminder Singh Sethi, Ludhiana (IN); Lakshmi Saroja Nalam, Bangalore (IN); Shelesh Chopra, Bangalore (IN)

(73) Assignee: Dell Products L.P., Round Rock, TX (US)

(*) Notice: Subject to any disclaimer, the term of this patent is extended or adjusted under 35 U.S.C. 154(b) by 197 days.

(21) Appl. No.: 17/582,545

(22) Filed: Jan. 24, 2022

(65) Prior Publication Data
US 2023/0237160 A1 Jul. 27, 2023

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .............................. G06F 21/00; G06F 2221/00
See application file for complete search history.

(56) References Cited

U.S. PATENT DOCUMENTS

| | | | | |
|---|---|---|---|---|
| 8,352,930 | B1* | 1/2013 | Sebes | G06F 8/65 704/4 |
| 8,621,453 | B2* | 12/2013 | Wookey | G06F 8/658 717/169 |
| 8,677,348 | B1* | 3/2014 | Ramanathpura | G06F 8/65 717/175 |
| 9,098,375 | B2* | 8/2015 | Narkinsky | G06F 8/658 |
| 9,372,784 | B2* | 6/2016 | Spanner | G06F 8/71 |
| 9,921,942 | B1 | 3/2018 | Makohon et al. | |
| 10,158,660 | B1 | 12/2018 | Reguly et al. | |
| 10,936,301 | B2* | 3/2021 | Suryanarayana | G06F 16/1847 |
| 11,099,836 | B2* | 8/2021 | Fox | B60W 50/0205 |
| 11,106,784 | B2 | 8/2021 | Rosendahl et al. | |
| 11,409,518 | B2* | 8/2022 | Maddukuri | G06F 16/23 |
| 11,435,929 | B2* | 9/2022 | Ganesan | H04L 9/0643 |

(Continued)

FOREIGN PATENT DOCUMENTS

EP 2820539 B1 10/2020

*Primary Examiner* — Gary S Gracia
(74) *Attorney, Agent, or Firm* — Chamberlain, Hrdlicka, White, Williams & Aughtry; Aly Dossa

(57) ABSTRACT

In general, embodiments relate to a method for proactively detecting and filtering vulnerabilities of an application upgrade, comprising: receiving an application upgrade request to upgrade an application to a version from a client device; sending information related to the application upgrade to a vulnerability validator; determining, based on the impact score information, that the version of the application has vulnerabilities and that a second version of the application does not have vulnerabilities; filtering, based on the determining, the version of the application that has vulnerabilities; generating an application upgrade strategy by only considering the second version of the application; and sending information related to the version of the application to a vendor to fix the vulnerabilities.

16 Claims, 5 Drawing Sheets

(56) References Cited

U.S. PATENT DOCUMENTS

| | | | |
|---|---|---|---|
| 11,481,498 B2 | 10/2022 | Velur et al. | |
| 11,522,899 B2* | 12/2022 | Somasundaram | H04L 63/20 |
| 11,783,062 B2* | 10/2023 | Lounsberry | G06F 21/6218 |
| | | | 726/30 |
| 11,880,292 B2 | 1/2024 | Korn | |
| 2006/0015941 A1 | 1/2006 | Mckenna | |
| 2007/0041663 A1* | 2/2007 | Cho | G06V 30/2504 |
| | | | 382/299 |
| 2007/0162460 A1* | 7/2007 | Long | G06F 8/658 |
| 2008/0201705 A1* | 8/2008 | Wookey | G06F 8/658 |
| | | | 717/175 |
| 2010/0218176 A1* | 8/2010 | Spanner | G06F 11/368 |
| | | | 717/170 |
| 2012/0150992 A1* | 6/2012 | Mays | G06F 9/451 |
| | | | 709/217 |
| 2012/0290455 A1* | 11/2012 | Mays | G06F 9/5072 |
| | | | 709/227 |
| 2013/0231093 A1* | 9/2013 | Toy | H04W 4/60 |
| | | | 455/414.1 |
| 2013/0347094 A1* | 12/2013 | Bettini | H04L 63/1433 |
| | | | 726/11 |
| 2014/0047426 A1* | 2/2014 | Raje | G06F 8/65 |
| | | | 717/168 |
| 2014/0173737 A1* | 6/2014 | Toback | G06F 21/57 |
| | | | 726/25 |
| 2014/0196020 A1* | 7/2014 | Shetty | G06F 8/658 |
| | | | 717/171 |
| 2014/0215450 A1* | 7/2014 | Salisbury | G06F 8/60 |
| | | | 717/172 |
| 2014/0245279 A1* | 8/2014 | Ohtake | G06F 9/445 |
| | | | 717/170 |
| 2014/0331281 A1 | 11/2014 | Bettini et al. | |
| 2014/0376362 A1* | 12/2014 | Selvaraj | H04L 41/082 |
| | | | 370/221 |
| 2015/0178063 A1* | 6/2015 | Narkinsky | G06F 8/658 |
| | | | 717/168 |
| 2015/0186125 A1* | 7/2015 | Avery | G06F 9/44578 |
| | | | 717/174 |
| 2017/0337372 A1 | 11/2017 | Zhang et al. | |
| 2018/0293061 A1* | 10/2018 | Arms | G06F 8/654 |
| 2019/0079849 A1* | 3/2019 | Korn | G06Q 10/04 |
| 2019/0236282 A1* | 8/2019 | Hulick, Jr. | G06F 16/951 |
| 2019/0317465 A1* | 10/2019 | Wei | G06F 21/53 |
| 2019/0340005 A1* | 11/2019 | Mace | G06F 9/45558 |
| 2019/0391800 A1* | 12/2019 | Lin | G06F 8/65 |
| 2020/0074084 A1* | 3/2020 | Dorrans | G06F 21/577 |
| 2020/0117807 A1* | 4/2020 | Nadgowda | G06F 8/65 |
| 2020/0242254 A1 | 7/2020 | Velur et al. | |
| 2020/0319871 A1* | 10/2020 | Fitzer | G06F 8/61 |
| 2021/0014256 A1* | 1/2021 | Malhotra | H04L 63/1425 |
| 2021/0173935 A1* | 6/2021 | Ramasamy | G06F 21/577 |
| 2022/0066768 A1* | 3/2022 | Takatsuna | H04L 67/34 |
| 2022/0100893 A1* | 3/2022 | Kussmaul | G06F 21/577 |
| 2022/0129561 A1 | 4/2022 | Shivanna et al. | |
| 2022/0138041 A1* | 5/2022 | Degrass | G06F 11/0709 |
| | | | 714/38.1 |
| 2022/0156383 A1 | 5/2022 | Schwarzbauer et al. | |
| 2022/0350588 A1* | 11/2022 | Liao | G06N 3/08 |
| 2023/0004653 A1* | 1/2023 | Shiraishi | G06F 21/577 |
| 2023/0125904 A1* | 4/2023 | Willett | G06F 16/21 |
| | | | 726/30 |
| 2023/0185921 A1* | 6/2023 | Karas | G06F 21/577 |
| | | | 726/25 |
| 2023/0305828 A1* | 9/2023 | Gujar | G06F 3/0652 |
| 2024/0056456 A1* | 2/2024 | Bouchard | H04L 63/145 |
| 2024/0134635 A1* | 4/2024 | Zhou | G06F 8/71 |

\* cited by examiner

METHOD AND SYSTEM FOR PROACTIVELY DETECTING AND FILTERING VULNERABILITIES OF AN APPLICATION UPGRADE BEFORE PERFORMING THE APPLICATION UPGRADE

BACKGROUND

Computing devices in a system may include any number of internal components such as processors, memory, and persistent storage. The computing devices may execute applications (e.g., software). Each application may be upgraded to newer versions to protect the computing devices from security vulnerabilities of the application.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

DETAILED DESCRIPTION

Figure 1:
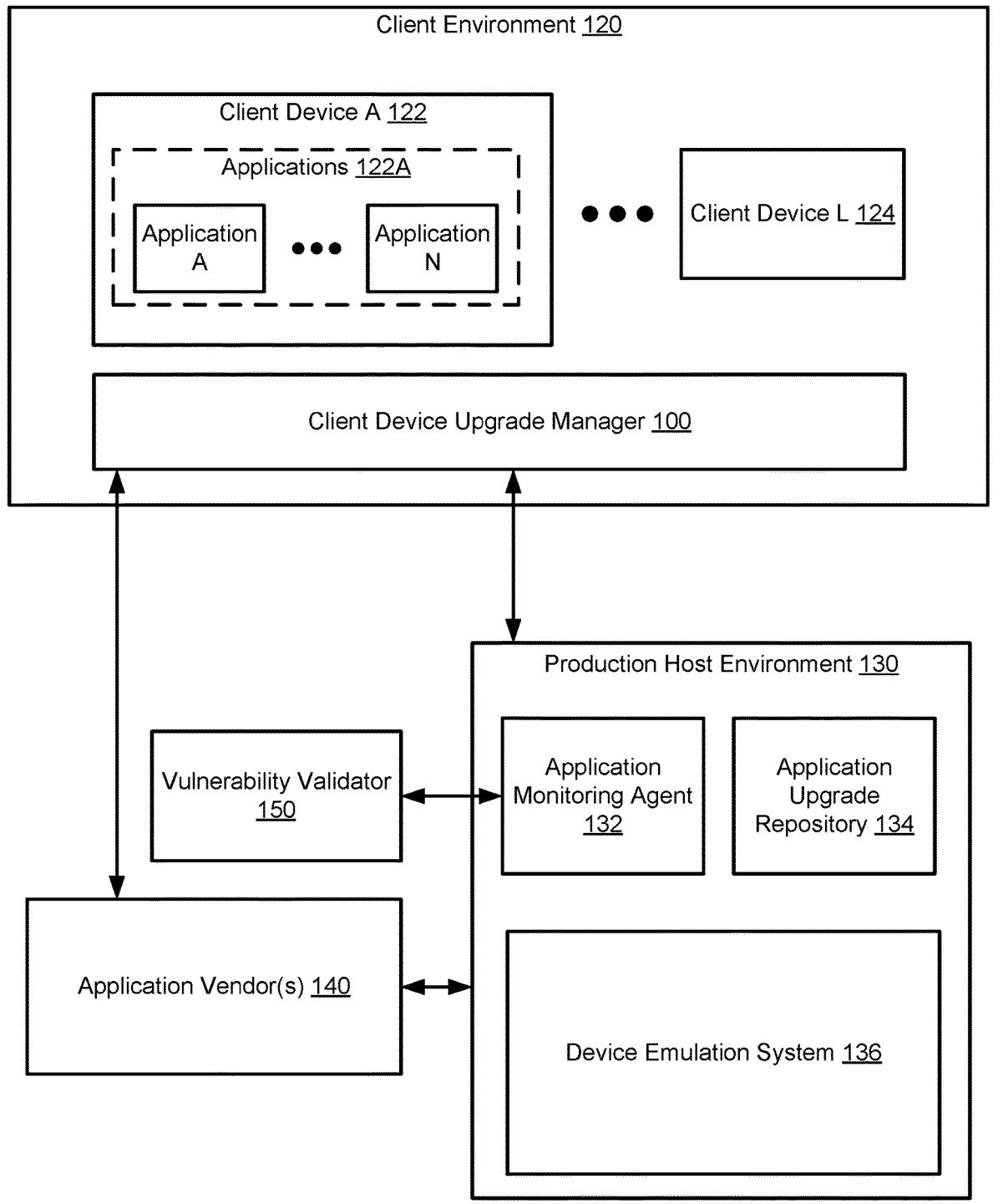
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

In general, a user of a client device (e.g., computing device) is unaware about whether an application upgrade has vulnerabilities and/or is at risk before performing the application upgrade. Embodiments of the invention relate to a method and system for proactively detecting and filtering vulnerabilities of an application upgrade before performing the application upgrade. More specifically, various embodiments of the invention receive an application upgrade request to upgrade an application to a specific version from a client device and send this information to a vulnerability validator. The vulnerability validator determines whether that the specific version of the application has vulnerabilities and based on the determination, a device emulation orchestration engine filters the specific version of the application that has vulnerabilities. Further, the device emulation orchestration engine generates an application upgrade strategy by only considering the specific version of the application that has no vulnerabilities. A client device upgrade manager sends information related to the filtered application upgrade to a vendor to fix the vulnerabilities.

The following describes various embodiments of the invention.

FIG. 1 shows a diagram of a system in accordance with one or more embodiments of the invention. The system includes a client environment (120), one or more application vendors (140), and a production host environment (130). The system may include additional, fewer, and/or different components without departing from the invention. Each component may be operably connected to any of the other component via any combination of wired and/or wireless connections. Each component illustrated in FIG. 1 is discussed below.

In one or more embodiments of the invention, the client environment (120) includes client devices (e.g., 122, 124, etc.) and a client device upgrade manager (100). Each client device (e.g., 122, 124, etc.) may include applications (e.g., 122A). The applications (e.g., 122A) may be logical entities executed using computing resources (not shown) of the client devices (e.g., 122, 124, etc.). Each of the applications may perform similar or different processes. In one or more embodiments of the invention, the applications (e.g., 122A) provide services to users, e.g., clients (not shown). For example, the applications (e.g., 122A) may host components. The components may be, for example, instances of databases, email servers, and/or other components. The applications (e.g., 122A) may host other types of components without departing from the invention. The applications (e.g., 122A) may be executed on one or more client devices (e.g., 122, 124, etc.) as instances of the application.

The applications (e.g., 122A) may be upgraded based on newer versions available for installation. The installation of application upgrades may be performed and/or otherwise initiated by the client device upgrade manager (100). In one or more embodiments of the invention, the client device upgrade manager (100) may periodically collect information (e.g., device state and configuration information, operating system version, application(s) installed, etc.) from the client devices (e.g., 122, 124, etc.) and may send this information to the application vendor(s) (140) for technical support (e.g., recommendations and/or fixes for hardware and/or software failures) to the client devices (e.g., 122, 124, etc.). Further, when there is an application upgrade that is available to fix critical application related issues, the client device upgrade manager (100) may identify the client devices (e.g., 122, 124, etc.) that require the application upgrade and the application vendor(s) (140) may provide a catalog file(s) that specifies the requirements of the identified client device(s) to the production host environment (130).

In one or more embodiments of the invention, the application upgrade repository (134) stores versions of the application upgrade(s). The application upgrade repository (134) may be updated by the application vendor(s) (140) based on the new versions of the application upgrades being available. The application upgrade repository (134) may further include catalog files in order for the application upgrade to be installed. The requirements may include, for example, a compatible device model, a minimum application version for the application upgrade to be installed, a compatible operating system (and corresponding version of such operating system), and an update sequence.

In one or more embodiments of the invention, the client device upgrade manager (100) may obtain application upgrade estimations that specify the required estimated time that the application upgrade may take. The client device upgrade manager (100) may provide the required estimated time for the application upgrade and optimal time slots in which the application upgrade may be performed.

In one or more embodiments of the invention, an application monitoring agent (132) can push the application upgrade(s) to the client device upgrade manager (100). In one or more embodiments of the invention, the application monitoring agent (132) may obtain a list of the client devices (e.g., 122, 124, etc.) that are managed by the client device upgrade manager (100) and the information related to the application(s) installed to those client devices from the client device upgrade manager. In one or more embodiments of the invention, the application monitoring agent (132) may identify a target client device (e.g., 122, 124, etc.) that is compatible with the application upgrade(s) based on the catalog file available in the application upgrade repository (134). Further, in response to a new application upgrade, the application monitoring agent (132) may initiate an estimation of performing the application upgrade on one or more of the client devices (e.g., 122, 124, etc.). The upgrade estimation(s) may be provided to the client device upgrade manager (100).

In one or more embodiments of the invention, the application upgrade may further include functionality for monitoring device configuration information of the client devices (e.g., 122, 124, etc.) such as operating system information, number of applications, current versions of such applications, processing power, memory capability, storage, etc. The device configuration information may be provided to the production host environment (130).

In one or more embodiments of the invention, the applications (e.g., 122A) are implemented as computer instructions, e.g., computer code, stored on a persistent storage that when executed by a processor(s) of a computing device cause the computing device (not shown) to provide the functionality of the applications described throughout this application.

Figure 5:
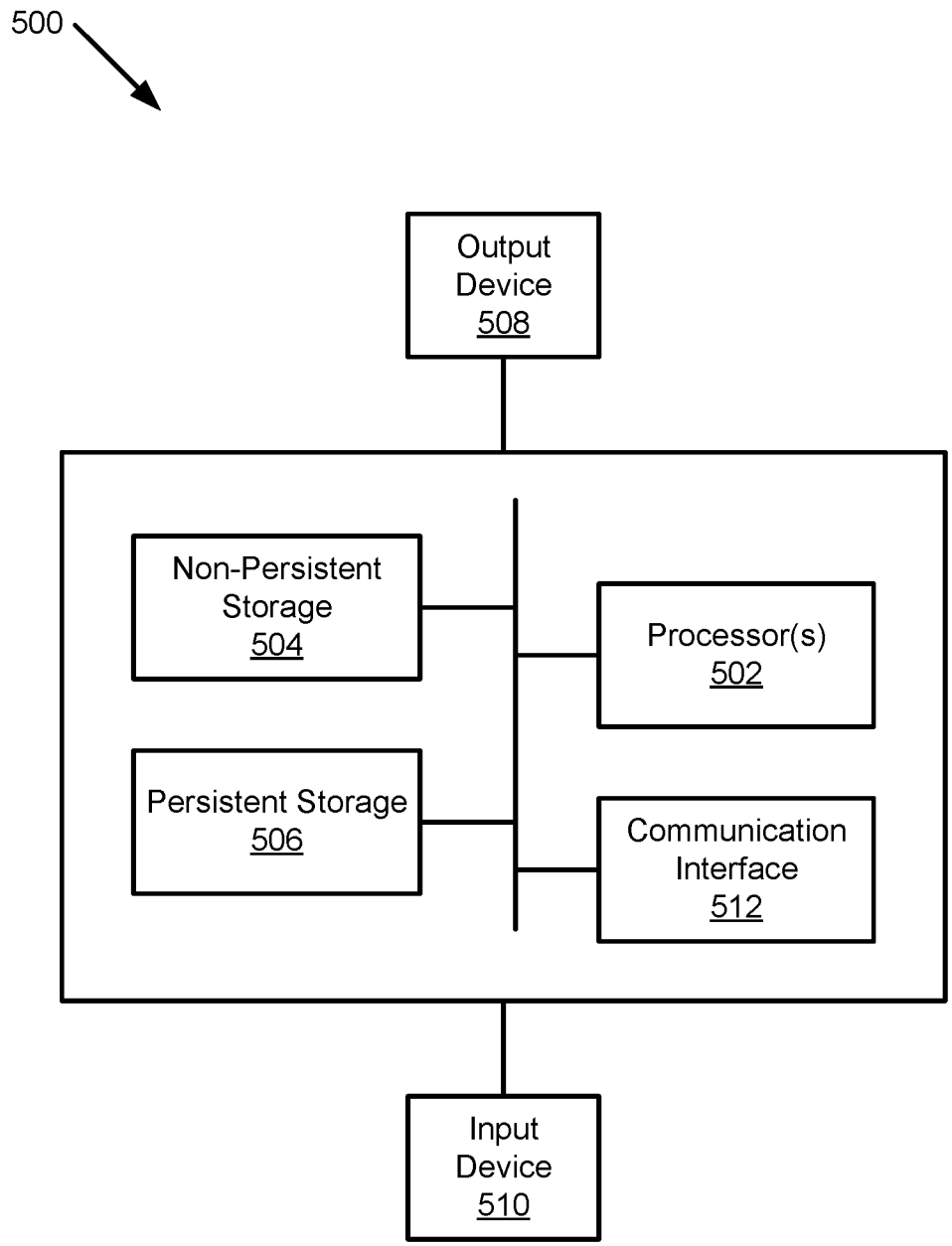
FIG. 5 shows a diagram of a computing device in accordance with one or more embodiments of the invention.

In one or more embodiments of the invention, the client device upgrade manager (100) is implemented as a computing device (see, e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client device upgrade manager (100) described throughout this application and/or all, or a portion thereof, of the method illustrated in FIG. 3.

In one or more embodiments of the invention, the client device upgrade manager (100) is implemented as a logical device. The logical device may utilize the computing resources of any number of computing devices and thereby provide the functionality of the client device upgrade manager (100) described throughout this application and/or all, or a portion thereof, of the methods illustrated in FIG. 3.

In one or more embodiments of the invention, the production host environment (130) estimates the upgrade times and required reboots to perform the application upgrade(s). The production host environment (130) may include the application monitoring agent (132), the application upgrade repository (134), and a device emulation system (136). The production host environment (130) may include additional, fewer, and/or different components without departing from the invention.

In one or more embodiments of the invention, the application monitoring agent (132) is implemented as a computing device (see, e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the application monitoring agent (132) described throughout this application and/or all, or a portion thereof, of the method illustrated in FIG. 3.

In one or more embodiments of the invention, the application monitoring agent (132) is implemented as a logical device. The logical device may utilize the computing resources of any number of computing devices and thereby provide the functionality of the application monitoring agent (132) described throughout this application and/or all, or a portion thereof, of the methods illustrated in FIG. 3.

In one or more embodiments of the invention, the device emulation system (136) is a system of device emulation containers that may be configured to emulate the client device (e.g., 122, 124, etc.). The emulation of the client devices may be used for performing the application upgrades on the emulated devices and measuring upgrade metrics such as time taken, number of reboots required, etc. For additional details regarding the device emulation system (136), see, e.g., FIG. 2.

In one or more embodiments of the invention, the device emulation system (136) is implemented as a computing device (see, e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation system (136) described throughout this application and/or all, or a portion thereof, of the methods illustrated in FIG. 3.

In one or more embodiments of the invention, the device emulation system (136) is implemented as a logical device. The logical device may utilize the computing resources of any number of computing devices and thereby provide the functionality of the device emulation system (136) described throughout this application and/or all, or a portion thereof, of the methods illustrated in FIG. 3.

In one or more embodiments of the invention, the production host environment (130) is implemented as a computing device (see, e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

In one or more embodiments of the invention, the production host environment (130) is implemented as a logical device. The logical device may utilize the computing resources of any number of computing devices and thereby provide the functionality of the production host environment (130) described throughout this application.

In one or more embodiments of the invention, a vulnerability validator (150) determines vulnerabilities of the application upgrade and/or an application(s) installed on the client device (e.g., 122, 124, etc.). In one or more embodiments of the invention, the vulnerability validator (150) includes a forest tree database (see e.g., FIG. 4), in which the forest tree database includes an impact score information of the application installed and an impact score of a subcomponent(s) of the application installed. Further, the forest tree database includes information related to the application installed such as the application version information of the application installed. Additional detail about the operation of the vulnerability validator (150) is provided below, e.g., in FIG. 4. Those skilled in the art will appreciate that the invention is not limited to the use of a forest tree database; rather, any data structure may be used by the vulnerability validator without departing from the invention.

In one or more embodiments of the invention, the vulnerability validator (150) is implemented as a computing device (see, e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the vulnerability validator (150) described throughout this application.

In one or more embodiments of the invention, the vulnerability validator (150) is implemented as a logical device. The logical device may utilize the computing resources of any number of computing devices and thereby provide the functionality of the vulnerability validator (150) described throughout this application.

Figure 2:
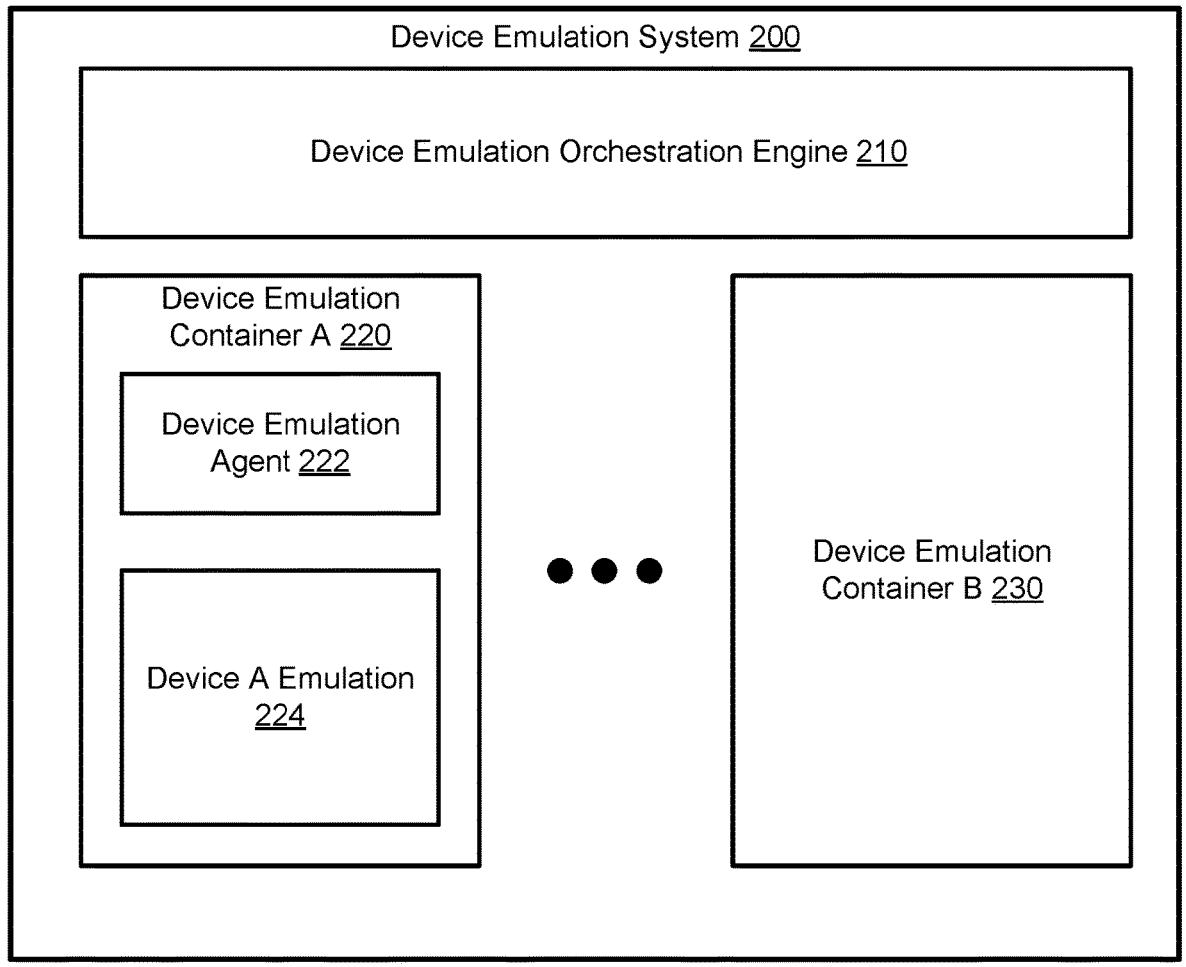
FIG. 2 shows a diagram of a device emulation system in accordance with one or more embodiments of the invention.

Turning now to FIG. 2, FIG. 2 shows a diagram of a device emulation system in accordance with one or more embodiments of the invention. The device emulation system (200) may be an embodiment of the device emulation system (e.g., 136, FIG. 1) discussed above, in which the device emulation system emulates the client devices (e.g., 122, 124, etc., FIG. 1). The device emulation system (200) may include a device emulation orchestration engine (210) and one or more device emulation containers (e.g., 220, 230). The device emulation system (200) may include additional, fewer, and/or different components without departing from the invention.

In one or more embodiments of the invention, the device emulation orchestration engine (210) orchestrates the generation of the device emulation containers (e.g., 220, 230). The device emulation orchestration engine (210) may obtain requests to emulate the application upgrade on an emulated device and to provide obtained upgrade estimations to the production host environment (e.g., 130, FIG. 1). The device emulation orchestration engine (210) may initiate the emulation of the devices and the application upgrade(s).

In one or more embodiments of the invention, the device emulation orchestration engine (210) is implemented as a computing device (see, e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation orchestration engine (210) described throughout this application.

In one or more embodiments of the invention, the device emulation orchestration engine (210) is implemented as a logical device. The logical device may utilize the computing resources of any number of computing devices and thereby provide the functionality of the device emulation orchestration engine (210) described throughout this application.

In one or more embodiments of the invention, the device emulation containers (e.g., 220, 230) include a device emulation agent (222) that monitors the application upgrade(s) performed on an emulated device (e.g., 224) of the device emulation container (e.g., 220, 230) to measure the time taken to perform each application upgrade and to track the number of reboots performed during the application upgrade.

This information may then be used to evaluate potential application upgrades and, based on this evaluation, determine whether one or more application upgrades should be push out to the one or more client devices.

Figure 3:
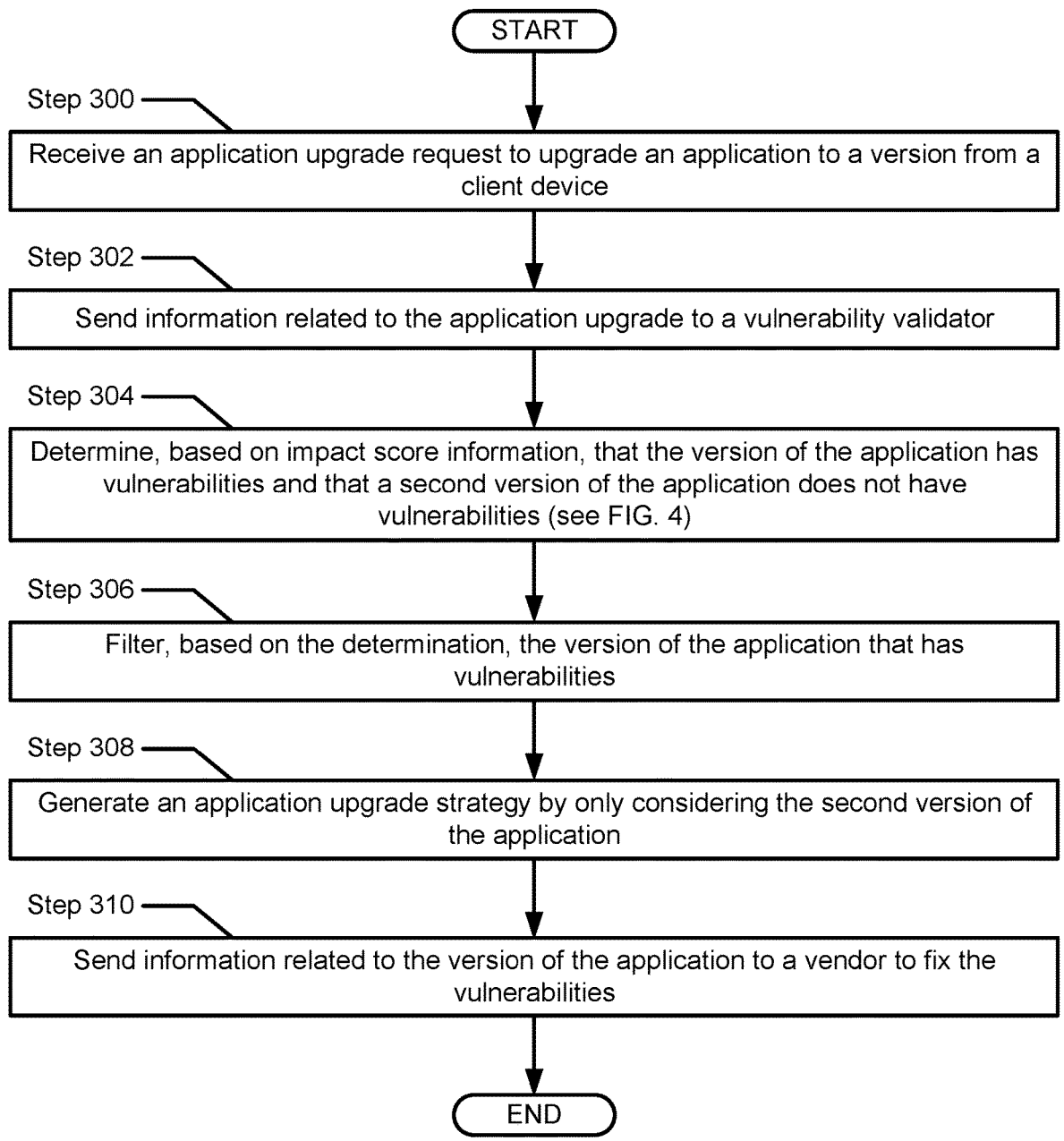
FIG. 3 shows a method to proactively detect and filter vulnerabilities of an application upgrade in accordance with one or more embodiments of the invention.

FIG. 3 shows a flowchart in accordance with one or more embodiments of the invention. While the various steps in the flowchart are presented and described sequentially, one of ordinary skill in the relevant art will appreciate that some or all of the steps may be executed in different orders, may be combined or omitted, and some or all steps may be executed in parallel without departing from the scope of the invention.

Turning now FIG. 3, FIG. 3 shows a method to proactively detect and filter vulnerabilities of an application upgrade in accordance with one or more embodiments of the invention. The method shown in FIG. 3 may be performed by, for example, the client device upgrade manager (e.g., 100, FIG. 1), the application monitoring agent (e.g., 132, FIG. 1), the vulnerability validator (e.g., 150, FIG. 1), and/or the device emulation orchestration engine (e.g., 210, FIG. 2). Other components of the system illustrated in FIG. 1 may perform the method of FIG. 3 without departing from the invention.

In Step 300, an application upgrade request to upgrade an application to a specific version from a client device is received. In one or more embodiments of the invention, the application upgrade request to upgrade the application to the specific version from the client device may be received by the client device upgrade manager (e.g., 100, FIG. 1). The device configuration information of the client device (e.g., 122, 124, etc., FIG. 1) may be obtained prior to receiving the application upgrade request to upgrade the application to the specific version from the client device.

In one or more embodiments of the invention, information related to the application upgrade may include, but is not limited to, application version information of the application upgrade. The information related to the application upgrade may include other details related to the application upgrade without departing from the invention.

In one or more embodiments of the invention, the device configuration information of the client device (e.g., 122, 124, etc., FIG. 1) may specify the configuration of a set of client devices that requested the application upgrade. The configuration may be associated with, for example, a current version of the operating system of the client device (e.g., 122, 124, etc., FIG. 1), the number of processors (e.g., central processing unit), the amount of memory available for the client device, a number of applications executing on the client device, and the amount of available persistent storage of the client device. Other configurations may be specified in the device configuration information without departing from the invention.

In Step 302, the information related to the application upgrade is sent to (or otherwise made available to) the vulnerability validator (e.g., 150, FIG. 1). In one or more embodiments of the invention, the client device upgrade manager (e.g., 100, FIG. 1) may send the information related to the application upgrade to the application monitoring agent (e.g., 132, FIG. 1), which may further send the information related to the application upgrade to the device emulation orchestration engine (e.g., 210, FIG. 2). The device emulation orchestration engine (e.g., 210, FIG. 2) may in turn send the information related to the application upgrade to the vulnerability validator (e.g., 150, FIG. 1).

In one embodiment of the invention, the application upgrade request may specify that the client device wants to upgrade to a specific version of the application. In response to this request, the device emulation orchestration engine (e.g., 210, FIG. 2) determines whether there are any dependencies for the specific version of the application (i.e., whether any other applications need to be installed on the client device prior version of the specific application being installed). In this scenario, the application update request is modified by the device emulation orchestration engine (e.g., 210, FIG. 2) to specify the dependencies, which also need to be evaluated by the vulnerability validator.

Continuing the discussion of FIG. 3, in Step 304, based on impact score information, whether the specific version(s) of the application has vulnerabilities is determined. In one or more embodiments of the invention, based on impact score information, whether the specific version of the application has vulnerabilities is determined by the vulnerability validator (e.g., 150, FIG. 1).

In one or more embodiments of the invention, for example, the information related to the application upgrade may specify that client device A has requested an upgrade of application A. The vulnerability validator (e.g., 150, FIG. 1) will determine the versions of the application A that are available for upgrading and will perform an analysis to calculate the impact score information of each potential version, and will determine whether the requested application upgrade can proceed. For additional detail regarding the calculation of the impact score information and the determination process, see, e.g., FIG. 4. In the scenarios in which other applications need to be installed prior to installing the version of the application, Step 304 also includes analysis of these other applications by the vulnerability validator (e.g., 150, FIG. 1).

In Step 306, based on the determination result from Step 304, specific versions of the application that have vulnerabilities are filtered out. In one or more embodiments of the invention, the specific versions of the application that have vulnerabilities are filtered out by the device emulation orchestration engine (e.g., 210, FIG. 2). For additional detail regarding the filtering process, see, e.g., FIG. 4. In the scenarios in which other applications need to be installed prior to installing the version of the application, if any of these other applications are determined to include vulnerabilities, they are also filtered out.

In Step 308, an application upgrade strategy is generated by only considering the specific version(s) of the application that has no vulnerabilities. In one or more embodiments of the invention, the application upgrade strategy is generated by the device emulation orchestration engine (e.g., 210, FIG. 2). In one embodiment of the invention, the application upgrade strategy includes and/or specifies the version of the application (or the appropriate installation packages) to be installed on the client device. The application upgrade strategy may also include the necessary scripts to be executed to enable installation of the selected version of the application.

Further, in scenarios in which the version of the application to be installed requires one or more other applications to be installed prior to installing the version of the application, the application upgrade strategy includes and/or specifies the other applications to be installed (along with an appropriate installation order and any required scripts). In the scenarios in which other applications need to be installed prior to installing the version of the application, these other applications must be determined to also not have any vulnerabilities (i.e., analyzed by the vulnerability validator). For additional detail regarding the generation of the application upgrade strategy, see, e.g., FIG. 4.

If any of these other applications have vulnerabilities, then the application upgrade strategy may not be generated as the application update is unable to proceed.

In Step 310, the information related to the filtered application upgrade is sent to the application vendors (e.g., 140, FIG. 1). In one or more embodiments of the invention, the information related to the filtered application upgrade may be sent to the application vendors (e.g., 140, FIG. 1) to fix the vulnerabilities by the client device upgrade manager (e.g., 100, FIG. 1). In one or more embodiments of the invention, the information related to the filtered application upgrade may specify the version of the application that has vulnerability as well as which subcomponents were evaluated along with the corresponding impact scores (see e.g., FIG. 4). In the scenarios in which other applications to be installed prior to installing the version of the application, the vendors for any of these other applications that are determined to have vulnerabilities are also notified.

In one or more embodiments of the invention, the fix corresponds to a software fix(es) to be installed on the client device, a script to executed on the client device, information about how to modify the configuration of the client device to address the vulnerability, or any combination thereof.

The method ends following Step 310.

Figure 4:
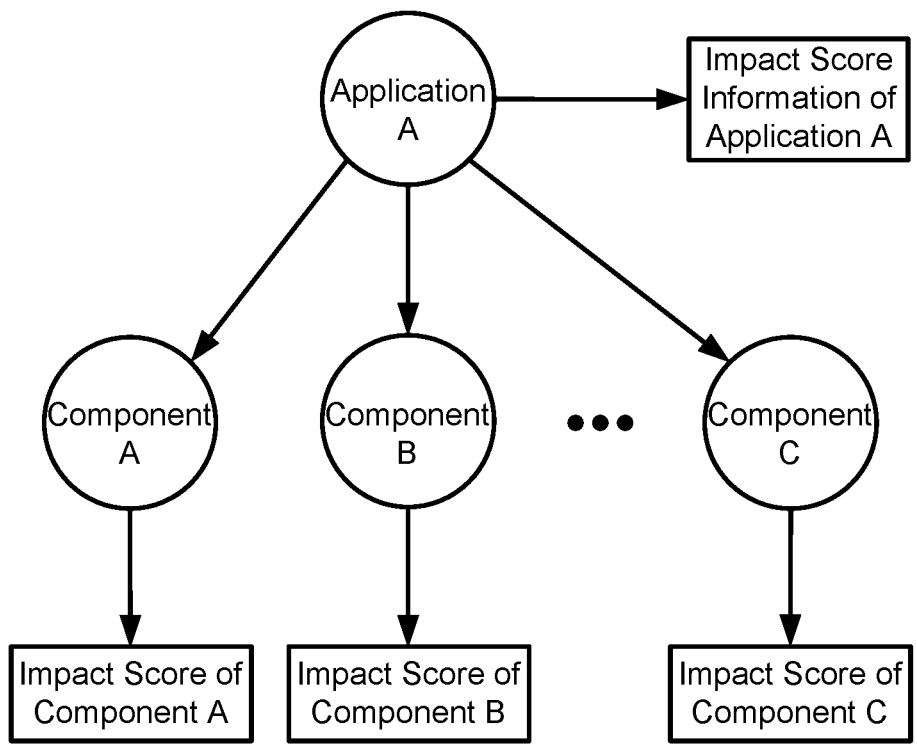
FIG. 4 shows a diagram of a forest tree database in accordance with one or more embodiments of the invention.

Turning now FIG. 4, FIG. 4 shows a diagram of a forest tree database in accordance with one or more embodiments of the invention. In one or more embodiments of the invention, the forest tree database specifies, for a given client device, an application upgrade (e.g., application A) and a subcomponent(s) (e.g., component A, component B, component C, etc.) of the application upgrade. In one or more embodiments of the invention, the subcomponent(s) of the application upgrade include, but are not limited to dynamically linked libraries and/or archive files.

In one or more embodiments of the invention, based on the impact score information (e.g., impact score information of application A), the vulnerability validator (e.g., 150, FIG. 1) determines whether a specific version of the application upgrade has vulnerabilities. In one or more embodiments of the invention, the vulnerability validator (e.g., 150, FIG. 1) calculates the vulnerability of the application upgrade based on a scoring system (e.g., common vulnerability scoring system). Further, in one or more embodiments of the invention, while performing the calculation, the vulnerability validator (e.g., 150, FIG. 1) takes into account one or more impact factor parameters such as attack vector, attack complexity, base score, and base severity.

Those skilled in the art will appreciate that while the above impact factor parameters are taken into account to perform the calculation, any other impact factor parameter may be used to calculate the vulnerability of the application upgrade without departing from the invention.

In one or more embodiments of the invention, the scoring system takes into account the impact score of the subcomponent(s) of the application upgrade to generate the impact score information. For example, in one embodiment of the invention, for version two of application A (e.g., the requested application upgrade version), the impact score of subcomponent A is 90%, the impact score of subcomponent B is 95%, and the impact score of subcomponent C is 95%. The average of the impact score of the subcomponent(s) of the application upgrade is determined and compared against a predetermined impact score information threshold (e.g., less than or equal to 90%). If the average of the impact score of the subcomponent(s) of the application upgrade is below the predetermined impact score information threshold, then the vulnerability validator classifies the application upgrade as having vulnerabilities. For the version two of application A, the average of the impact score of the subcomponent(s) of the application upgrade is 93.3%, which is above the predetermined impact score information threshold and, thus, the application upgrade is classified as having no vulnerabilities.

In another embodiment of the invention, for version three of application A (e.g., the requested application upgrade version), the impact score of subcomponent A is 90%, the impact score of subcomponent B is 95%, and the impact score of subcomponent C is 75%. For the version three of application A, the average of the impact score of the subcomponent(s) of the application upgrade is 86.7%, which is below the predetermined impact score information threshold and, thus, the application upgrade to the version three of application A is classified as having vulnerabilities.

In another embodiment of the invention, for version four of application A (e.g., the requested application upgrade version), the impact score of subcomponent A is 95%, the impact score of subcomponent B is 95%, and the impact score of subcomponent C is 95%. For the version four of application A, the average of the impact score of the subcomponent(s) of the application upgrade is 95%, which is above the predetermined impact score information threshold and, thus, the application upgrade to the version four of application A is classified as having no vulnerabilities.

In one or more embodiments of the invention, based on the examples provided above, the request to application upgrade version three of the application A will be filtered by the device emulation orchestration engine (e.g., 210, FIG. 2) and the request to application upgrade version two of the application A and version four of the application A will be considered while generating the application upgrade strategy. In one embodiment of the invention, the application upgrade strategy is determined by selecting a specific version of the application that is to be installed on the client device. Thus, in the example above, version four of application A may be selected.

The selection of the specific version of the application to be installed may be based on any number of factors, such as, selecting the highest version of the application that does not include vulnerabilities; or selecting a version of the application from the filtered set that is able to be successfully installed on the client device. Continuing with the above example, the device emulation orchestration engine may emulate installation of both version two and version four of Application A and determine whether none, one or both versions of the Application A can be successfully installed on the client device. If none of the applications are successfully installed then no application upgrade strategy is generated. If only one of the versions of the applications is successfully installed, then this version of the application is included as part of application upgrade strategy. If both versions of the application are successfully installed, then a policy and/or heuristic may be used to select the version of the application to include in the application upgrade strategy.

In the scenarios in which other applications have to be installed prior to installing the version of the application, these other applications must be determined to also not have any vulnerabilities (i.e., analyzed by the vulnerability validator (e.g., 150, FIG. 1)).

In one or more embodiments of the invention, the application vendor(s) (e.g., 140, FIG. 1) may be notified by the client device upgrade manger (e.g., 100, FIG. 1) to provide a fix(es) for at least one filtered application upgrade version (e.g., application upgrade version three of the application A).

Those skilled in the art will appreciate that while the common vulnerability scoring system is used as the scoring system to calculate the vulnerabilities of the specific version of the application, any other scoring system may be used to calculate the vulnerabilities of the specific version of the application without departing from the invention.

Further, those skilled in the art will appreciate that while the forest tree database is described above with respect to including a single installed application, the forest tree database includes information related to multiple applications and multiple versions of the same application along with their corresponding subcomponents.

Turning now to FIG. 5, FIG. 5 shows a diagram of a computing device in accordance with one or more embodiments of the invention.

In one or more embodiments of the invention, the computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN), such as the Internet, mobile network, or any other type of network) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed above should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for proactively detecting and filtering vulnerabilities of an application upgrade, the method comprising:
   receiving, by a client device upgrade manager (CDUM), an application upgrade request to upgrade an application to a version from a client device, wherein, prior to receiving the request, the CDUM obtains information of the client device,
      wherein a client environment comprises the client device and the CDUM, wherein the CDUM comprises at least a memory and a processor coupled to the memory;
   sending, by the CDUM, the information to a vulnerability validator;
   determining, based on impact score information extracted from the information and by the vulnerability validator, that the version of the application has vulnerabilities and that a second version of the application does not have vulnerabilities, wherein the vulnerability validator analyzes a vulnerability of a second application that needs to be installed prior to installing the second version of the application on the client device, wherein, based on the analysis of the second application, the vulnerability validator infers that the second application does not have vulnerabilities;
   filtering, based on the determining and by a device emulation orchestration engine, the version of the application that has vulnerabilities, wherein a production host environment comprises the device emulation orchestration engine;
   generating, by the device emulation orchestration engine, an application upgrade strategy by only considering the second version of the application, the second application, and an installation order of the second version of the application and the second application on the client device, wherein the installation order specifies that the second application needs to be installed prior to installing the second version of the application on the client device; and
   sending, by the CDUM, information related to the version of the application to a vendor to fix the vulnerabilities.

2. The method of claim 1, wherein the vulnerability validator comprises a forest tree database, wherein the forest tree database comprises an impact score of a subcomponent of the application upgrade.

3. The method of claim 2, wherein impact score information is calculated based on the impact score of the subcomponent of the application upgrade.

4. The method of claim 2, wherein the subcomponent of the application upgrade is a dynamically linked library or an archive file.

5. The method of claim 1, wherein the information related to the application upgrade comprises at least application version information of the application upgrade.

6. A non-transitory computer readable medium comprising computer readable program code, which when executed by a computer processor enables the computer processor to perform a method for proactively detecting and filtering vulnerabilities of an application upgrade, the method comprising:
   receiving, by a client device upgrade manager (CDUM), an application upgrade request to upgrade an application to a version from a client device, wherein, prior to receiving the request, the CDUM obtains information of the client device,
      wherein a client environment comprises the client device and the CDUM, wherein the CDUM comprises at least a memory and a processor coupled to the memory;
   sending, by the CDUM, the information to a vulnerability validator;
   determining, based on impact score information extracted from the information and by the vulnerability validator, that the version of the application has vulnerabilities and that a second version of the application does not have vulnerabilities, wherein the vulnerability validator analyzes a vulnerability of a second application that needs to be installed prior to installing the second version of the application on the client device, wherein, based on the analysis of the second application, the vulnerability validator infers that the second application does not have vulnerabilities;
   filtering, based on the determining and by a device emulation orchestration engine, the version of the application that has vulnerabilities, wherein a production host environment comprises the device emulation orchestration engine;

generating, by the device emulation orchestration engine, an application upgrade strategy by only considering the second version of the application, the second application, and an installation order of the second version of the application and the second application on the client device, wherein the installation order specifies that the second application needs to be installed prior to installing the second version of the application on the client device; and sending, by the CDUM, information related to the version of the application to a vendor to fix the vulnerabilities.

7. The non-transitory computer readable medium of claim 6, wherein the vulnerability validator comprises a forest tree database, wherein the forest tree database comprises an impact score of a subcomponent of the application upgrade.

8. The non-transitory computer readable medium of claim 7, wherein impact score information is calculated based on the impact score of the subcomponent of the application upgrade.

9. The non-transitory computer readable medium of claim 7, wherein the subcomponent of the application upgrade is a dynamically linked library or an archive file.

10. The non-transitory computer readable medium of claim 6, wherein the information related to the application upgrade comprises at least application version information of the application upgrade.

11. A system for proactively detecting and filtering vulnerabilities of an application upgrade, the system comprising:
  a vulnerability validator;
  a production host environment comprising a device emulation orchestration engine; and
  a client environment comprising a client device and a client device upgrade manager (CDUM), wherein the CDUM comprises a memory and a processor coupled to the memory, wherein the processor is configured to:
    receive an application upgrade request to upgrade an application to a version from the client device, wherein, prior to receiving the request, the CDUM obtains information of the client device;
    send the information to the vulnerability validator,
    wherein based on impact score information extracted from the information, the vulnerability validator determines that the version of the application has vulnerabilities and that a second version of the application does not have vulnerabilities, wherein the vulnerability validator analyzes a vulnerability of a second application that needs to be installed prior to installing the second version of the application on the client device, wherein, based on the analysis of the second application, the vulnerability validator infers that the second application does not have vulnerabilities,
    wherein, based on the determining, the device emulation orchestration engine filters the version of the application that has vulnerabilities,
    wherein the device emulation orchestration engine generates an application upgrade strategy by only considering the second version of the application, the second application, and an installation order of the second version of the application and the second application on the client device,
    wherein the installation order specifies that the second application needs to be installed prior to installing the second version of the application on the client device; and
    send information related to the version of the application to a vendor to fix the vulnerabilities.

12. The system of claim 11, wherein the vulnerability validator determines vulnerabilities of the version of the application and the second version of the application.

13. The system of claim 11, wherein the vulnerability validator comprises a forest tree database, wherein the forest tree database comprises an impact score of a subcomponent of the application upgrade.

14. The system of claim 13, wherein impact score information is calculated based on the impact score of the subcomponent of the application upgrade.

15. The system of claim 13, wherein the subcomponent of the application upgrade is a dynamically linked library or an archive file.

16. The system of claim 11, wherein the information related to the application upgrade comprises at least application version information of the application upgrade.

* * * * *